US005383715A

United States Patent [19]

Homma et al.

[11] Patent Number: 5,383,715

[45] Date of Patent: Jan. 24, 1995

[54] WHEEL PROVIDED WITH SUB-WHEELS

[75] Inventors: Akira Homma; Susumu Homma; Hiroshi Sato; Hisao Hiroi, all of Tokamachi, Japan

[73] Assignee: Homma Science Corporation, Tokamachi, Japan

[21] Appl. No.: 969,225

[22] PCT Filed: Jul. 27, 1992

[86] PCT No.: PCT/JP92/00952

§ 371 Date: Feb. 9, 1993

§ 102(e) Date: Feb. 9, 1993

[87] PCT Pub. No.: WO93/02872

PCT Pub. Date: Feb. 18, 1993

[30] Foreign Application Priority Data

Aug. 8, 1991 [JP] Japan ........ 3-199636

[51] Int. Cl.[6] ........ B60B 19/00

[52] U.S. Cl. ........ 301/5.23; 301/5.1

[58] Field of Search ........ 301/5.1, 5.23; 180/7.1, 180/7.2

[56] References Cited

U.S. PATENT DOCUMENTS

| | | | |
|---|---|---|---|
| 1,305,535 | 6/1919 | Grabowiecki | 301/5.23 |
| 4,926,952 | 5/1990 | Farnam | 301/5.23 |

FOREIGN PATENT DOCUMENTS

| | | | |
|---|---|---|---|
| 2619098 | 11/1977 | Germany . | |
| 3702660 | 8/1988 | Germany | 301/5.23 |
| 32-1751 | 3/1957 | Japan . | |
| 57-139406 | 8/1982 | Japan . | |
| 58-30424 | 2/1983 | Japan . | |
| 59-109402 | 6/1984 | Japan . | |

*Primary Examiner*—Russell D. Stormer
*Attorney, Agent, or Firm*—Ladas & Parry

[57] ABSTRACT

A wheel provided with sub-wheels, in which a plurality of sub-wheels (31) supported rotatably about an axis extending in the same direction as that tangential to the circular rim (12) of the wheel are arranged on the circular rim to constitute a tire (40). The rotation of the tire and that of the sub-wheels are combined to cause the wheel to run in an arbitrary direction.

6 Claims, 21 Drawing Sheets

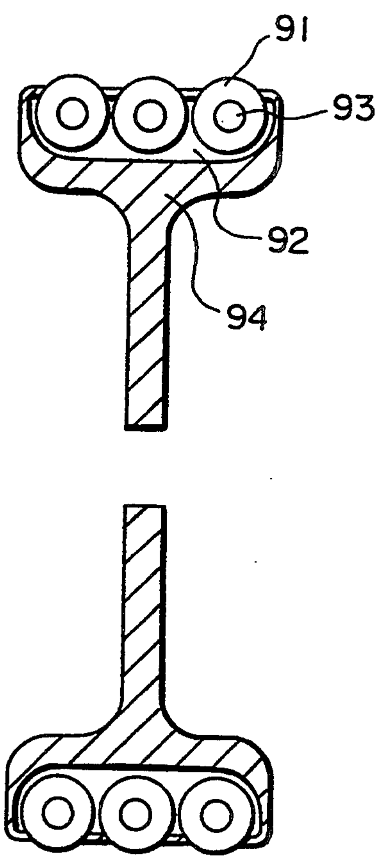
F I G. 25

WHEEL PROVIDED WITH SUB-WHEELS

TECHNICAL FIELD

The present invention relates to a wheel which runs in rotation, and more particularly to a wheel provided with sub-wheels having two directions of running in rotation which intersect perpendicularly to each other.

BACKGROUND ART

Almost all wheels which run on the ground or the floor comprise a tire part which is made of rubber or metal, this tire part constituting the outer peripheral portion of the wheel, a rim part for supporting the tire part, and a disk or spoke which connects the rim part to the hub.

Since the wheel as stated above is rotated about a wheel axle or shaft, the running direction thereof is limited to a direction perpendicular to the wheel shaft.

For this reason, in the case where the running direction of the wheel is required to be changed, a method is adopted comprising swinging the wheel shaft itself to a direction perpendicular to the running direction by using a steering gear connected to the wheel shaft.

However, it is often difficult to carry out the swinging operation of the wheel using the method comprising swinging the entire wheel in the running direction together with the wheel shaft because of the greater contact frictional force between the tire and the ground (the floor) during stoppage of the wheel. Furthermore, the wheel is required to uselessly follow a locus of a circular arc until it is directed to a desired running direction, which makes change in the running direction of the wheel within a narrow space difficult.

As a means for solving such a problem, a caster device is used which serves to swing the entire wheel about a shaft orientated perpendicular to the wheel shaft and provided at an eccentric position. However, the caster device cannot perfectly solve the above-mentioned problem, and still includes problems such as difficulty in changing the running direction of the wheel during stoppage thereof or difficulty in conversion of the direction of the wheel to that perpendicular to the running direction. In addition, since the caster device easily changes the direction of the wheel shaft during the running thereof, there is a restriction in its use which makes it impossible to increase the running speed of the wheel and the diameter thereof.

Furthermore, a further means to solve the above-mentioned problems has been developed and comprises a wheel device in which two independent wheels with wheel shafts perpendicularly intersecting each other are combined. However, this wheel device has a disadvantage in that it is necessary to provide a means for shifting and drawing in one of the wheels when the other is being used, which results in a complicated construction and a larger-sized device.

DISCLOSURE OF INVENTION

The problem to be solved by the invention is to simply change the running direction of a wheel without describing a locus of a circular arc. A further problem is to realize a wheel device which permits simple change in the running direction of the wheel as mentioned above, with a simple and smaller-sized construction.

In order to solve the above-mentioned problems, the present invention is characterized in that a tire is constituted by arranging on a circular rim of the wheel a plurality of sub-wheels each supported rotatably about its axis orientated in a direction tangential to the circular rim of the wheel.

The wheel provided with sub-wheels according to the invention enables the tire to run in a direction perpendicular to that of the rotation of the wheel shaft because of the rotation of the sub-wheels, while enabling the tire to run in the direction of the rotation of the wheel shaft. In addition, a combination of the rotation of the tire with that of the sub-wheels permits the wheel to run in an arbitrary direction without swinging the wheel shaft to the running direction thereof.

BRIEF DESCRIPTION OF THE DRAWINGS

FIG. 25 is a sectional view taken along line A—A of FIG. 23;

BEST MODES FOR CARRYING OUT THE INVENTION

Now, embodiments of the invention will be described with reference to the drawings.

Figure 1:
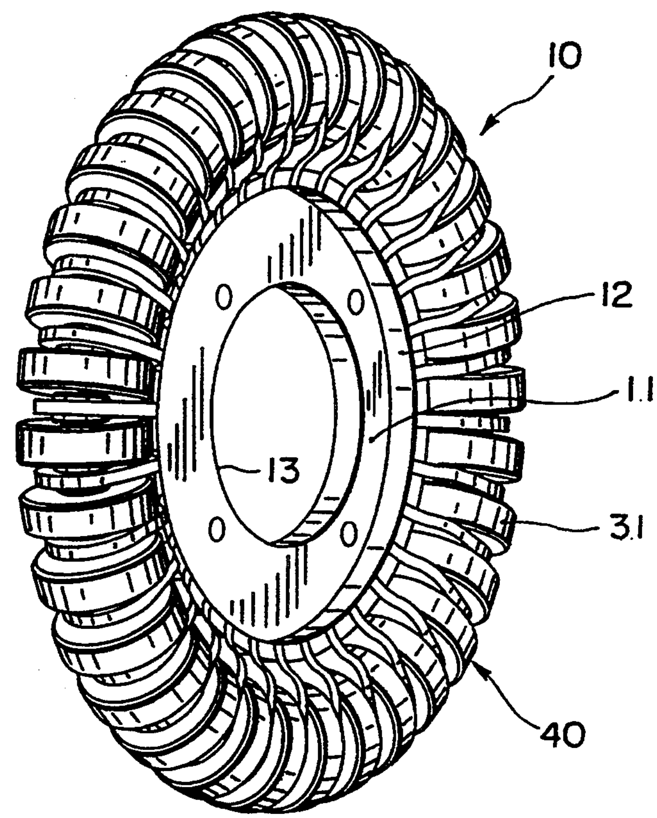
FIG. 1 is a perspective view showing the exterior appearance of an embodiment of a wheel provided with sub-wheels according to the invention.

FIG. 1 is a perspective view illustrating an embodiment of a wheel 10 provided with sub-wheels according to the invention.

Referring to the drawings, numeral 11 designates a disk for supporting the entire wheel. The disk 11 is formed at the outer periphery thereof with a circular rim 12 and is provided at the center portion with an opening 13 through which a wheel axle or shaft (not shown) is inserted.

Figure 2:
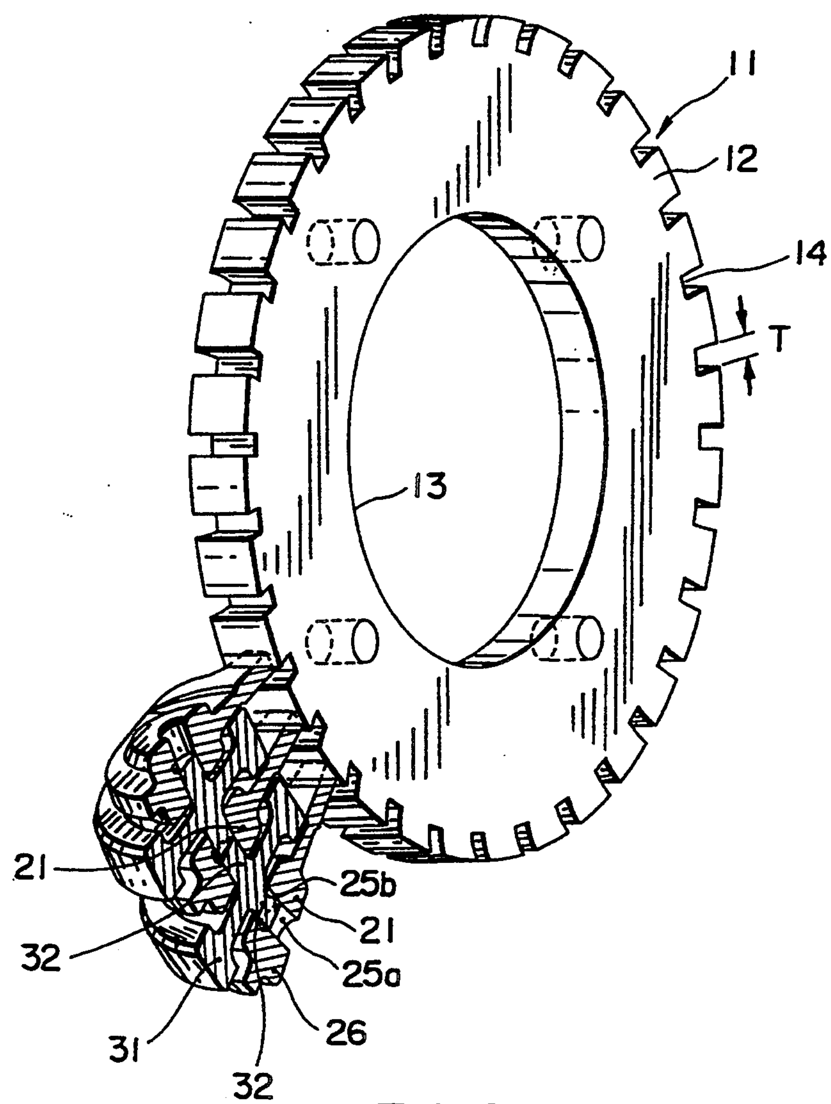
FIG. 2 is a perspective view, partly in cross section, of a disk with sub-wheel supporting plates and sub-wheels mounted on the disk.

As shown in FIG. 2, a plurality of grooves 14 are provided on the circular rim 12 at equal pitch intervals and in the same direction as the axis of the circular rim 12. A base end 22 of each of sub-wheel supporting plates 21 is fitted in a respective one of the grooves 14.

Each of the sub-wheel supporting plates 21 is in the form of a plate and is provided with the base end 22 fitted in a groove 14 and a sub-wheel bearing 23 provided at the end opposite to the base end 22.

The base end 22 has a thickness t which is the same as or somewhat greater than the width T of the groove 14. The sub-wheel bearing 23 has bearing holes passing through the sub-wheel supporting plate 21, which are constituted by two bearing holes **25*a* and 25*b* having their respective axes 24*a* and 24*b* each inclined by an angle $\theta$ from a line perpendicular to the sub-wheel supporting plate 21 towards the side of the base end 22. Furthermore, the sub-wheel bearing 23 is provided with two inclined bosses 26, each having an inclined surface 26*a* inclined at an angle $\theta$ with respect to the sub-wheel supporting plate 21 so as to converge towards the base end 22 in order to make the bearing length of the two bearing holes 25*a*, 25*b* greater. The angle $\theta$ is determined by the number of grooves 14 provided on the circular rim 12, that is, the number of sub-wheels supported by the sub-wheel supporting plate 21**.

Figure 5:
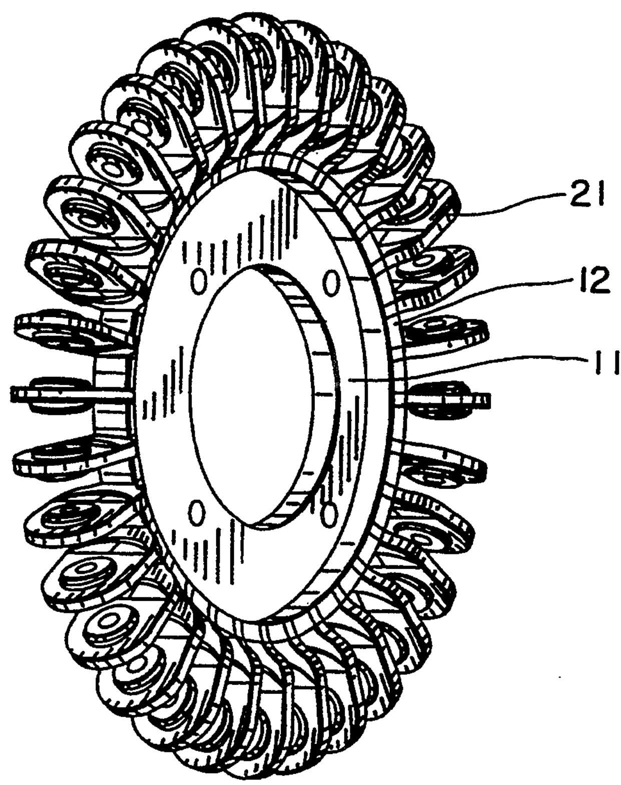
FIG. 5 is a perspective view showing a plurality of sub-wheel supporting plates mounted on the disk.

As shown in FIGS. 2 and 5, the sub-wheel supporting plates 21 of the construction as stated above, are fixedly mounted on the outer periphery of the circular rim 12 at equal pitch intervals by fitting the base ends 22 of the plates 21 into the grooves 14 of the circular rim 12.

Figure 3:
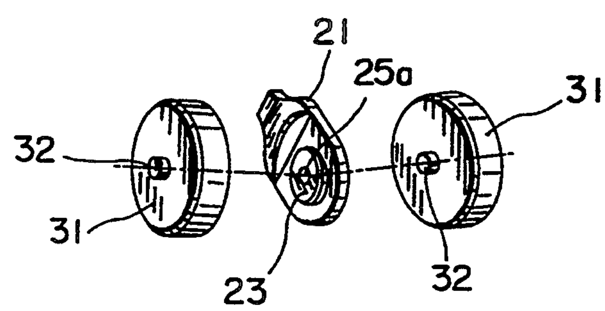
FIG. 3 is an exploded perspective view illustrating how the sub-wheels are mounted on the sub-wheel supporting plate.
Figure 4A:
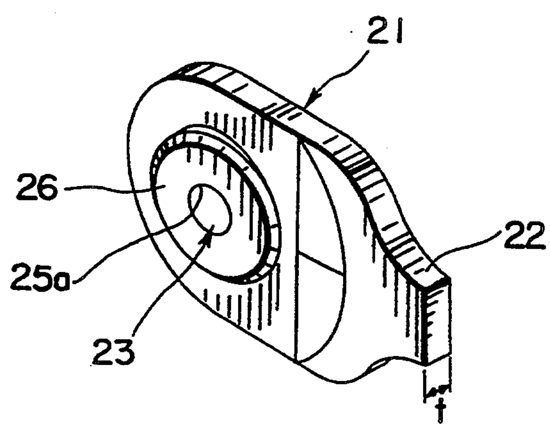
FIGS. 4(*a*) and (*b*) are a perspective view and a top plan view illustrating an example of the sub-wheel supporting plate, respectively.
Figure 4B:
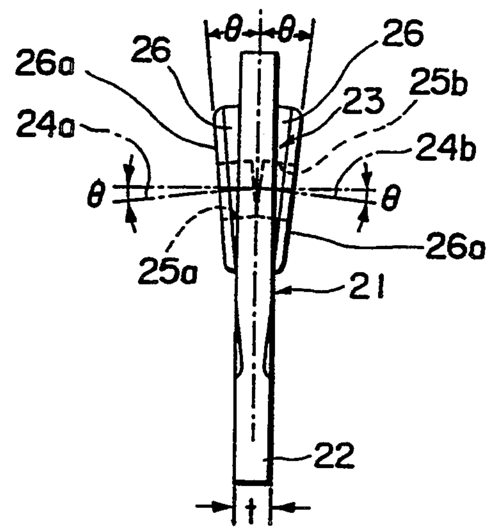

The sub-wheel supporting plates 21 are secured to the outer periphery of the circular rim 12 by fitting the sub-wheels 31 to the sub-wheel bearings 23 from opposite sides of the sub-wheel supporting plate 21, as shown in FIG. 3.

As shown in FIGS. 1, 2 and 3, the sub-wheels 31 are in the form of disks, each one being formed at the center of each side surface thereof with a rotational supporting shaft 32 projecting therefrom. The width of the outer periphery of the sub-wheel is preferably made as large as possible, as long as it does not rub against the base end side of the sub-wheel supporting plate 21.

The outer diameter of the sub-wheel 31 is such that the radial outer end portion thereof, after being fitted to the sub-wheel supporting plate 21, projects outward beyond the outermost end portion of the sub-wheel supporting plate 21.

Each of the sub-wheels 31 is supported at each end thereof by a sub-wheel supporting plate 21, with the rotational supporting shafts 32 thereof being inserted in the bearing holes **25*a*, 25*b* of the sub-wheel bearing 23. In order to rotatably support the sub-wheel 31 with the rotational supporting shafts 32 thereof as a center, the bearing holes 25*a*, 25*b* and the rotational supporting shafts 32 are constituted as bearing constructions. For such bearing constructions, plain bearings, ball and roller bearings and the like may be employed depending on the load applied to the sub-wheel 31** or the rotational speed thereof.

As shown in FIG. 1, the outermost peripheral part (tire part) 40 of the wheel 10 is constituted by supporting rotatably each of a plurality of sub-wheels on the sub-wheel supporting plates 21 to thereby dispose them at equal pitch intervals on the outer periphery of the circular rim 12.

The wheel 10 provided with sub-wheels 31 according to the embodiment of the construction as described above provides the following advantageous effects.

The wheel 10 provided with sub-wheels 31 is mounted on a wheel shaft using the opening 13 of the disk 11 and can be used as a wheel having the tire 40 constituted by a plurality of sub-wheels 31 mounted on the circumference. That is, when the wheel is rotated about the wheel shaft (not shown), it runs in the same direction as that of the rolling movement of the tire 40, similar to an ordinary wheel.

The sub-wheels 31 are independently rotated by rotating each of the sub-wheels 31 about its axis by means of an actuator (not shown) or applying an external force thereto in the same direction as that of the wheel shaft. The rotation of the sub-wheels 31 causes the wheel 10 to move in the same direction as the wheel shaft (the direction perpendicular to that of the rolling movement of the tire 40). The movement of the wheel is simply carried out without requiring any greater force also in the state where the wheel 10 is stopped.

When the rolling movement of the tire 40 and the rotation movement of the sub-wheels 31 are carried out simultaneously, the wheel 10 runs in the direction of the combined vector of both movements. Consequently, if the rotation movement of the tire 40 and the rotation movement of the sub-wheels 31 are controlled simultaneously, the wheel 10 can be moved in an arbitrary direction without turning the wheel shaft.

FIGS. 6 to 9 are views illustrating a second embodiment of the invention.

In this embodiment, sub-wheel supporting members 42 for rotatably supporting the sub wheels 41 are made greater in size than those of the preceding embodiment to thereby increase the strength thereof.

Figure 9:
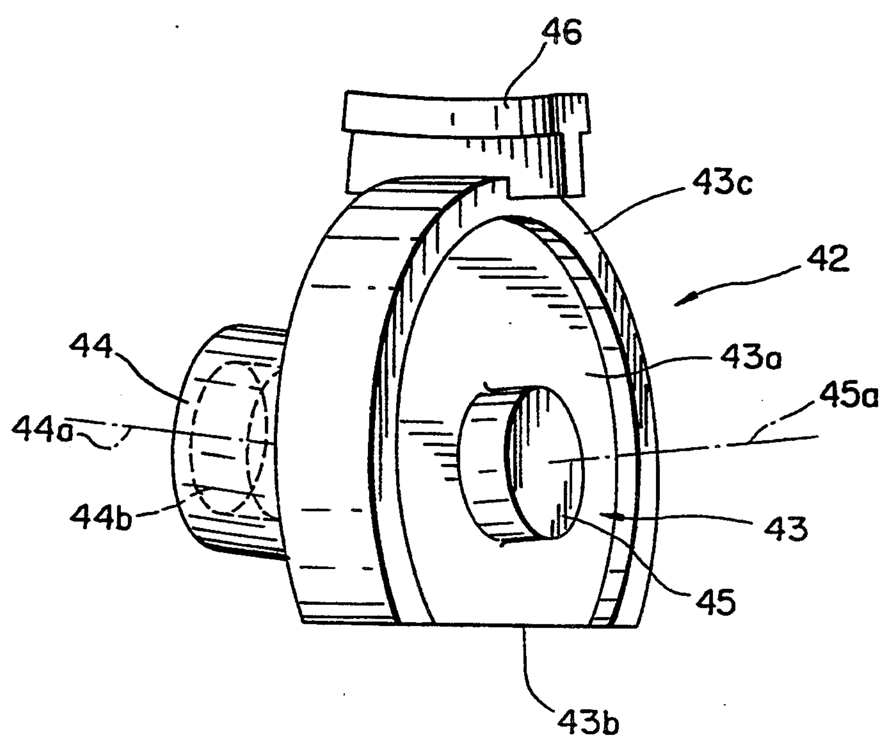
FIG. 9 is a perspective view showing a sub-wheel supporting member in the second embodiment of the invention.

As shown in FIG. 9, the sub-wheel supporting member 42 includes a notched inclined plate-like disk 43 prepared by cutting off the bottom of the inclined disk member of the trapezoid-like cross-section with two inclined surfaces **43*a* along a cut surface 43*b* parallel to the bottom side. Furthermore, the notched inclined disk member 43 is provided in the outer periphery thereof with outer peripheral edges 43*c* extending outwardly in the axial direction from the two inclined surfaces 43*a***.

The two inclined surfaces 43*a* are each inclined by an angle of $\theta$ in the direction of convergence with each other with respect to a surface perpendicular to the cut surface 43*b*. A main shaft 44 is provided on one of the two inclined surfaces 43*a* and a sub-shaft 45 is provided on the other, each of the shafts extending outward perpendicularly to the respective inclined surfaces. That is, the respective axes 44*a* and 45*a* of the main shaft 44 and the sub-shaft 45 are inclined by the angle of $\theta$ with respect to a line parallel to the cut surface 43*b*. The main shaft 44 is provided at the center thereof with a hole 44*b* in which the sub-shaft 45 of an adjacent sub-wheel supporting member 42 can be fitted.

A guide rail member 46 of the T-shaped cross-section is secured to the end opposite the cut surface 43*b* of the notched inclined disk member 43, substantially parallel to the cut surface 43*b*.

Figure 8:
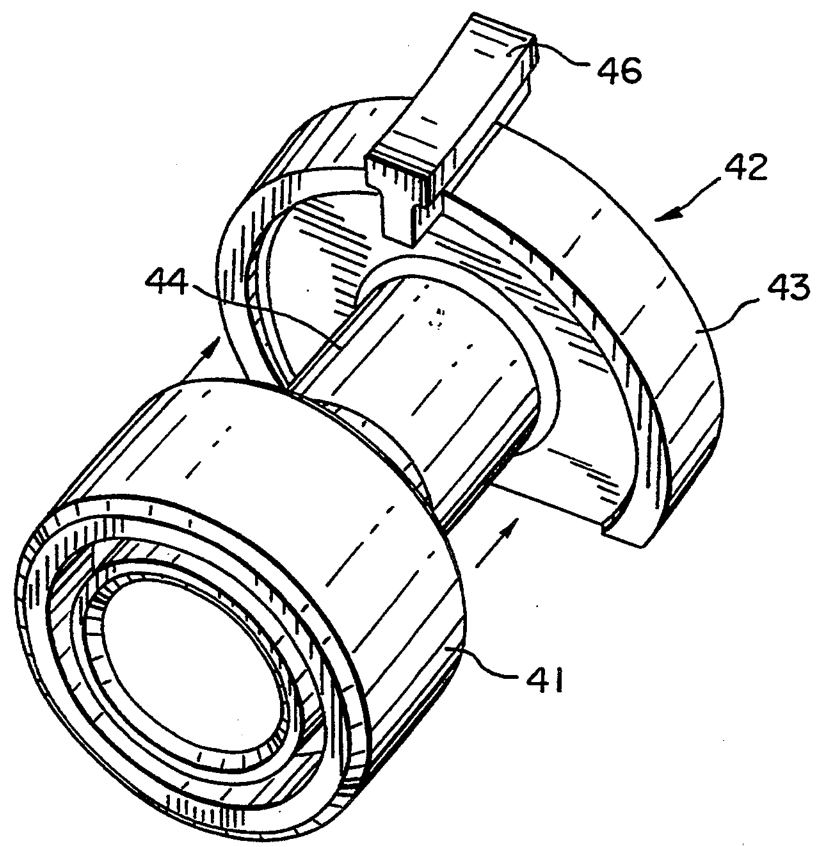
FIG. 8 s an exploded perspective view illustrating the construction for supporting the sub-wheel in the second embodiment.

As shown in FIG. 8, a hollow cylindrical sub-wheel 41 with a diameter smaller than that of the notched inclined disk member 43 is rotatably mounted on the main shaft 44 of the sub-wheel supporting member 42. A bearing member such as a ball or roller bearing or a plain bearing (not shown) is interposed in the fitting part between the main shaft 44 and the sub-wheel 41.

Figure 7:
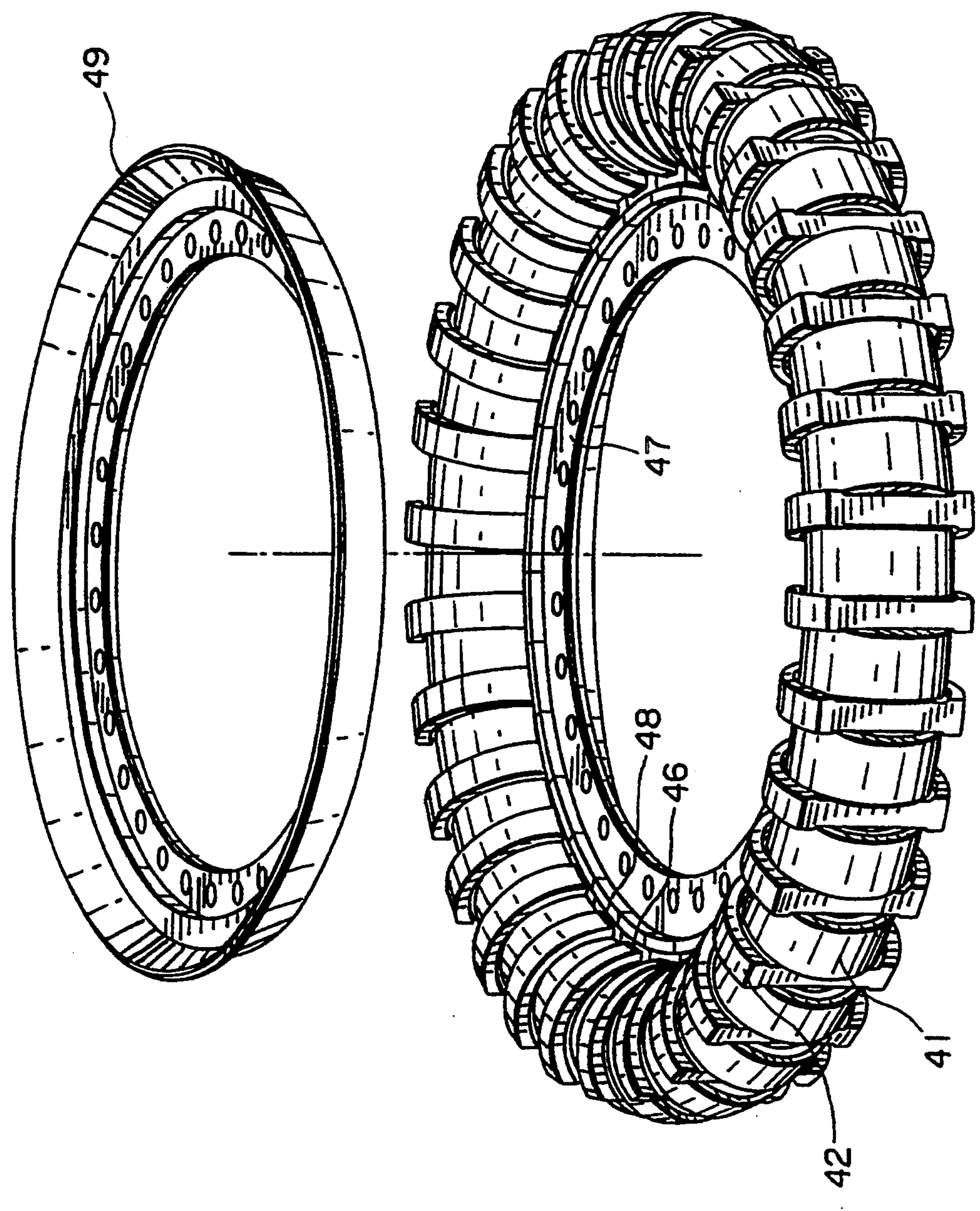
FIG. 7 is a perspective view indicating how the wheel provided with sub-wheels according to the second embodiment is assembled.

As shown in FIG. 7, the sub-wheel supporting members 42 with the respective sub-wheels 41 mounted thereon, are fitted to the circular rim member 47 by inserting them into a plurality of grooves 48 formed on the outer periphery thereof in the same direction as the axis of the wheel at equal pitch intervals.

The sub-wheel supporting members 42 are continuously fitted to the outer periphery of the circular rim member 47 in such a manner that the sub-shafts 45 of the adjacent sub-wheel supporting members 42 are fitted in the center holes 44*b* of the main shafts 44, which results in a construction wherein the main shafts 44 are supported at both ends thereof.

Figure 6:
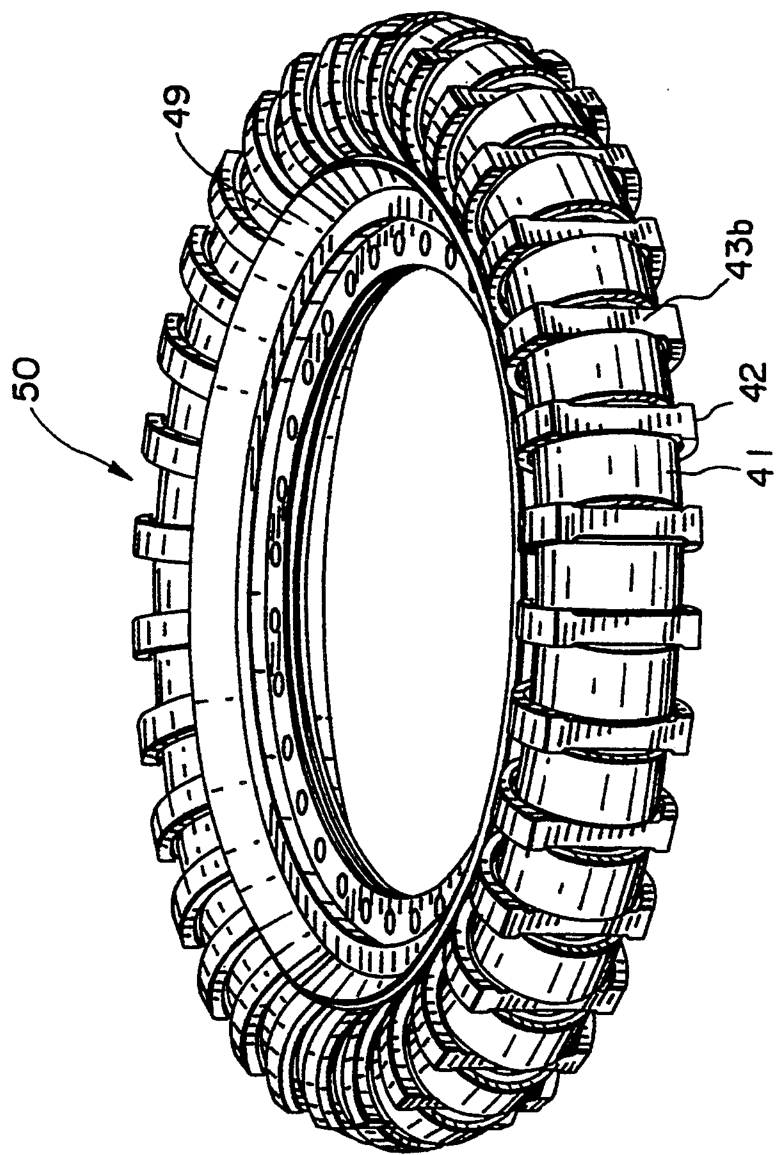
FIG. 6 is a perspective view illustrating a second embodiment of the invention.

A rim cover 49 is subsequently attached to the rim member 47 and a wheel 50 provided with the sub-wheels 41 is obtained as shown in FIG. 6. This wheel 50 permits a possible increase in the load applied to each sub-wheel 41, because the sub-wheel 41 is rotatably supported on the main shaft 44 with a greater diameter and simultaneously the free end of the main shaft 44 is mounted on and held by the sub-shaft 45 of the adjacent sub-wheel supporting member 42.

Since a portion of the sub-wheel 41 is arranged so as to extend radially outwardly from the cut surface 43*b* of the sub-wheel supporting member 42, the wheel 50 can be moved in the same direction as the wheel shaft, similarly as in the preceding embodiment. The outermost peripheral part (tire part) of the wheel 50 is formed by the plurality of sub-wheels arranged at equal pitch intervals so that the wheel 50 can run in the same direction as that of the rolling movement of the tire, similarly as in the case of an ordinary wheel.

The wheel 50 according to the invention can be used as a wheel to which a greater load is applied. The outer diameter of the notched inclined disk member 43 made greater than the diameter of the sub-wheel 41 is capable of preventing any foreign matter from colliding with the sub-wheels 41 from the side of the wheel 50.

Figure 10:
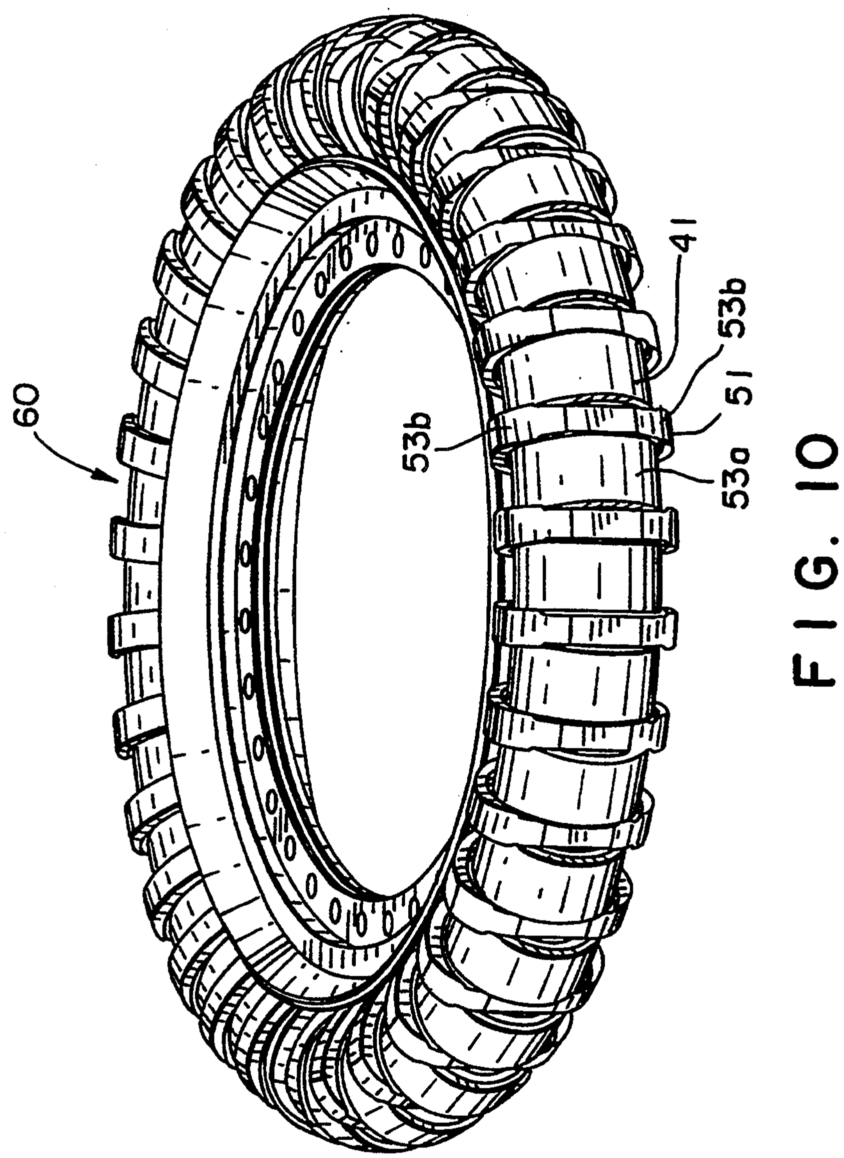
FIG. 10 is a perspective view showing a modification of the second embodiment of the invention.

FIG. 10 is a perspective view illustrating a modification of the embodiment shown in FIG. 6. In a wheel 60 provided with sub-wheels according to this embodiment, two ends 53*b* of a cut surface 53*a* of a notched disk member of each of sub-wheel supporting members 51 for supporting rotatably sub-wheels 41 are contoured in a smooth circular arc.

Since the construction other than that stated above is the same as the preceding second embodiment, description thereof is omitted.

The contour of a circular arc at the two ends of the cut surface 53*a* of the sub-wheel supporting member 51 provides a smooth configuration for the outer periphery of the wheel 60, which results in fewer collisions of a part of the sub-wheel supporting member 51 with the ground in the rolling movement of the wheel 60 and movement of the sub-wheels 41 in the direction of the wheel shaft due to rotation of the sub-wheels. The wheel 60 according to this embodiment is particularly suitable in the case where the wheel is used in an inclined state.

FIGS. 11 to 15 are views illustrating a third embodiment of the invention.

Figure 12:
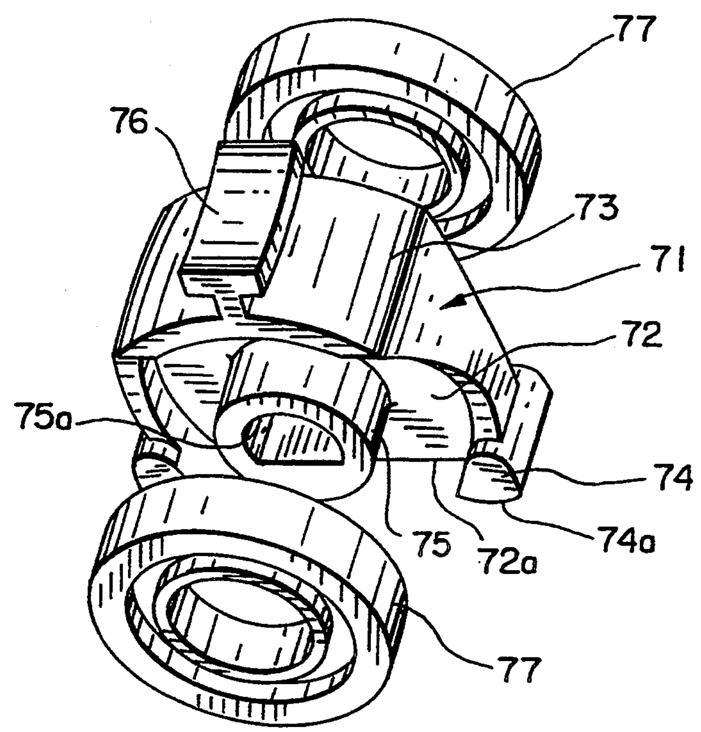
FIG. 12 is a perspective view indicating a state where the sub-wheels are incorporated into the sub-wheel supporting member in the third embodiment.

In this embodiment, the sub-wheel supporting member is fitted, at both ends of a cut surface thereof, with elastic members made of something like an edge rubber. FIG. 12 shows the sub-wheel supporting member 71 used in the present embodiment. The sub-wheel supporting member 71 includes a notched disk member 72 made by cutting off a portion of the disk member along a cut surface 72*a* parallel to the diametrical direction, and a rim 73 formed along the outer periphery of the notched disk member 72. A guide rail member 76 of a T-shaped section is secured to the rim 73 at the end opposite the cut surface 72*a*, parallel to the axis of the notched disk member 72. The rim 73 is fitted at both ends thereof with edge rubbers 74, each having an inclined surface 74*a* inclined so as to diverge outwardly, each said edge rubber 74 projecting from the cut surface 72*a*. Furthermore, the notched disk member 72 is provided at the center of each of the sides thereof with a sub-wheel supporting shaft 75 projecting therefrom and having a hole 75*a* including a straight line portion. The sub-wheel supporting shafts 75 are provided so as to be perpendicular to the notched disk member 72.

Figure 13:
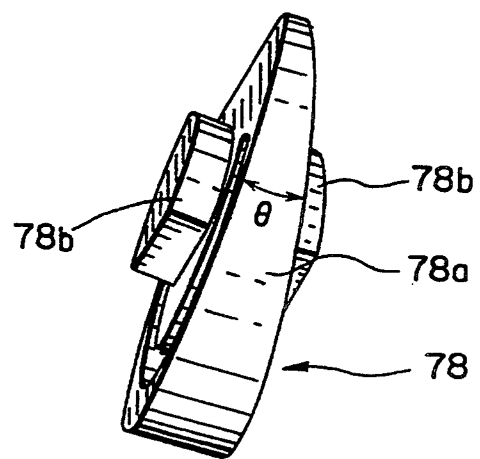
FIG. 13 is a perspective view of a joint protector.
Figure 14:
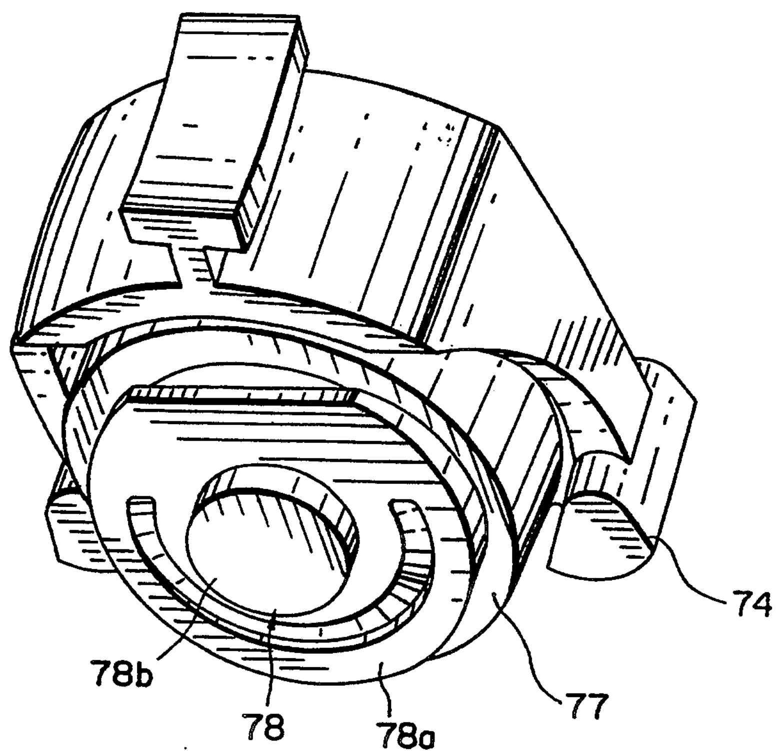
FIG. 14 is a perspective view illustrating the construction for supporting the sub-wheels in the third embodiment.

Each of the hollow cylindrical sub-wheels 77 is rotatably fitted around the sub-wheel supporting shafts 75 from opposite sides of the notched disk member 72. As shown in FIG. 14, a joint protector 78 is fitted to each of the sub-wheels 77 mounted on the sub-wheel supporting shafts 75. As shown in FIG. 13, the joint protector 78 comprises a wedge-like plate 78*a* formed so as to have an angle $\theta$ between its opposite surfaces and two short shafts 78*b* extending from both surfaces of the wedge-like plate 78*a* and intersecting perpendicularly thereto. Each of the short shafts 78*b* has a cross section for fitting into a center hole 75*a* of the sub-wheel supporting shaft 75.

The joint protector 78 is fitted to each sub-wheel 77 with the side thereof which is greater in thickness being directed in the direction of the cut surface 72*a* of the notched disk member 72, and the sub-wheel supporting shafts 75 of the adjacent sub-wheel supporting members 71 are continuously connected through the short shafts 78*b* of the joint protector 78.

Figure 11:
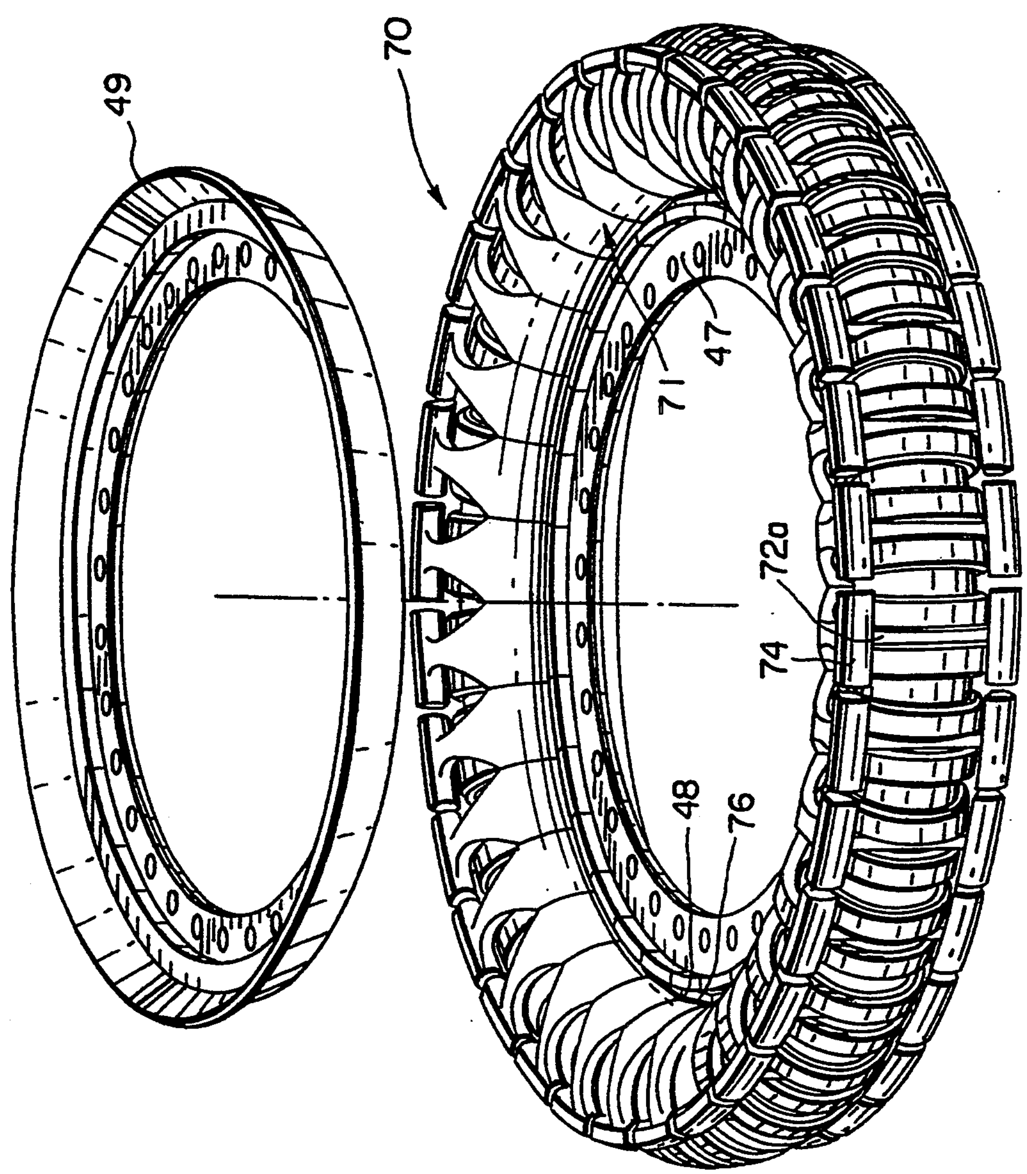
FIG. 11 is a perspective view illustrating a third embodiment of the invention.

A wheel 70 provided with sub-wheels is constituted, as shown in FIG. 11, by inserting the guide rail members 76 of the sub-wheel supporting members 71 with the sub-wheels 77 rotatably supported therein, into a plurality of grooves 48 formed on the outer periphery of the circular rim member 47 at equal pitch intervals, similarly as in the preceding embodiments.

Figure 15:
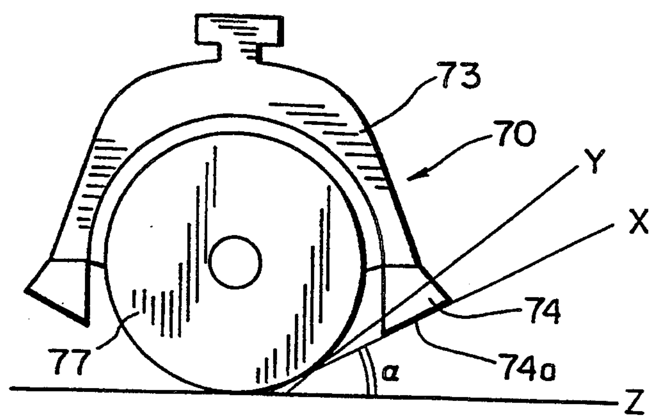
FIG. 15 is a schematic perspective view indicating the rotation and braking function of the sub-wheels in the third embodiment.

The wheel 70 according to the present embodiment performs a function of causing the edge rubber 74 to come into contact with the floor when the wheel 70 is inclined more than a predetermined angle, thereby braking the rotation of the sub-wheels 77. That is, as shown in FIG. 15, when the wheel 70 is inclined by an angle of $\alpha$ and the position of the floor Z reaches a position of X, the edge rubber 74 starts to come into contact with the floor X.

As the wheel 70 is further inclined until the position of the floor varies from X to Y, the edge rubber 74 becomes elastically deformed, causing the action of braking the rotation of the sub-wheel 77 to increase.

When the wheel 70 is further inclined until the position of the floor exceeds a position Y, the elastic deformation of the edge rubber 74 reaches a limit and the sub-wheel 77 leaves the floor Y. This stops the movement of the sub-wheel 77 in the direction perpendicular to the running direction of the wheel 70 due to the rotation of the sub-wheel 77. Accordingly, the wheel 70 runs in the direction of the rotation of the main shaft thereof due to the contact of the edge rubber 74 with the floor Y.

This function provides particularly superior effects in the case where the wheel 70 according to this embodiment is used for a sporting good which runs on a slope. For example, the wheel 70 according to the present embodiment can be fitted to an elongated plate member on which an operator can put his one foot, to thereby constitute a running device. If a pair of the running devices are prepared and the operator runs on a slope with each foot on one of the running devices, he can then carry out a lateral sliding motion with a feeling similar to that of an ordinary ski, thereby permitting the control of the running speed and direction thereof.

Furthermore, since in the wheel 70 according to the present embodiment, the sub-wheel supporting shafts 75 are supported by means of the joint protectors 78 in the construction of supporting at both ends, the sub-wheels 77 can be loaded by a great load.

FIGS. 16 to 22 are views illustrating a modification of the third embodiment of the invention as described above.

Figure 17:
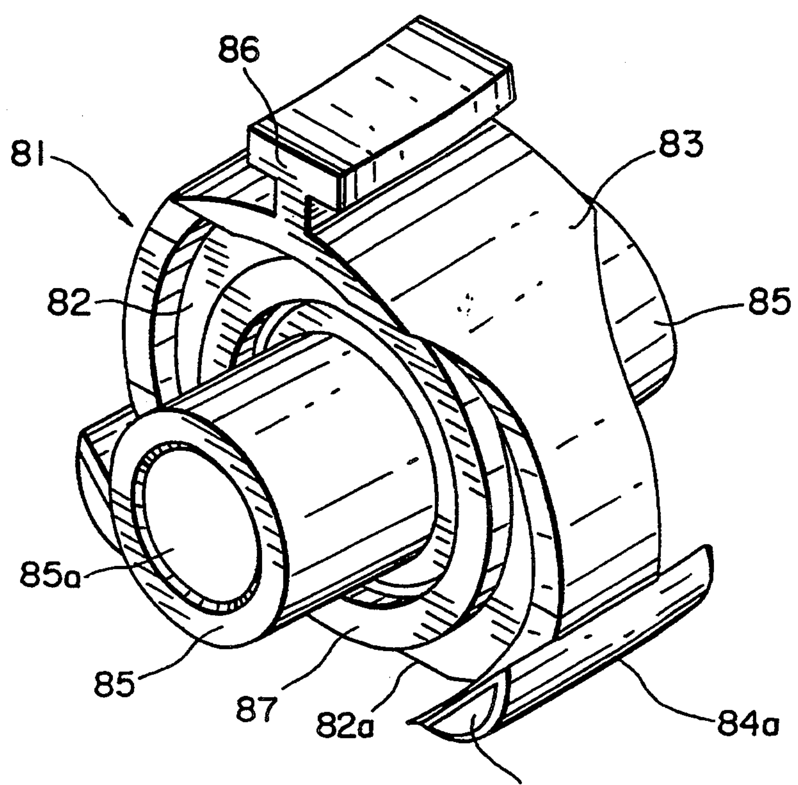
FIG. 17 is a perspective view illustrating a modification of the sub-wheel supporting member.

In this embodiment, a sub-wheel supporting member is fitted at both ends of the cut surface thereof with elastic members such as rubber, similar to the third embodiment. FIG. 17 shows the sub-wheel supporting member 81 used for the present embodiment. The sub-wheel supporting member 81 comprises a notched disk member 82 formed by cutting off a portion of the disk member along a cut surface 82*a* parallel to the diametrical direction, and a rim 83 formed along the outer periphery of the notched disk member 82. A guide rail member 86 of T-shaped cross section is secured to the end of the rim 83 opposite the cut surface 82a, parallel to the axis of the notched disk member 82. Edge rubbers 84 with inclined surfaces inclined so as to expand outwardly are fitted to two ends of the rim 83, said edge rubbers projecting over the cut surface 82*a*. The two side surfaces of the notched disk member 82 are inclined by an angle of $\theta$ towards the guide rail member 86 and are each provided with a sub-wheel supporting shaft 85 projecting therefrom and having a hole 85*a*. Furthermore, a projection 87 is provided around the sub-wheel supporting shaft 85 to seal a clearance between the notched disk member 82 and the sub-wheel 88 in such a manner as a labyrinth. Each of the sub-wheel supporting shafts 85 and the projection 87 is so orientated as to be perpendicular to the side surfaces of the notched disk member 82.

Figure 18:
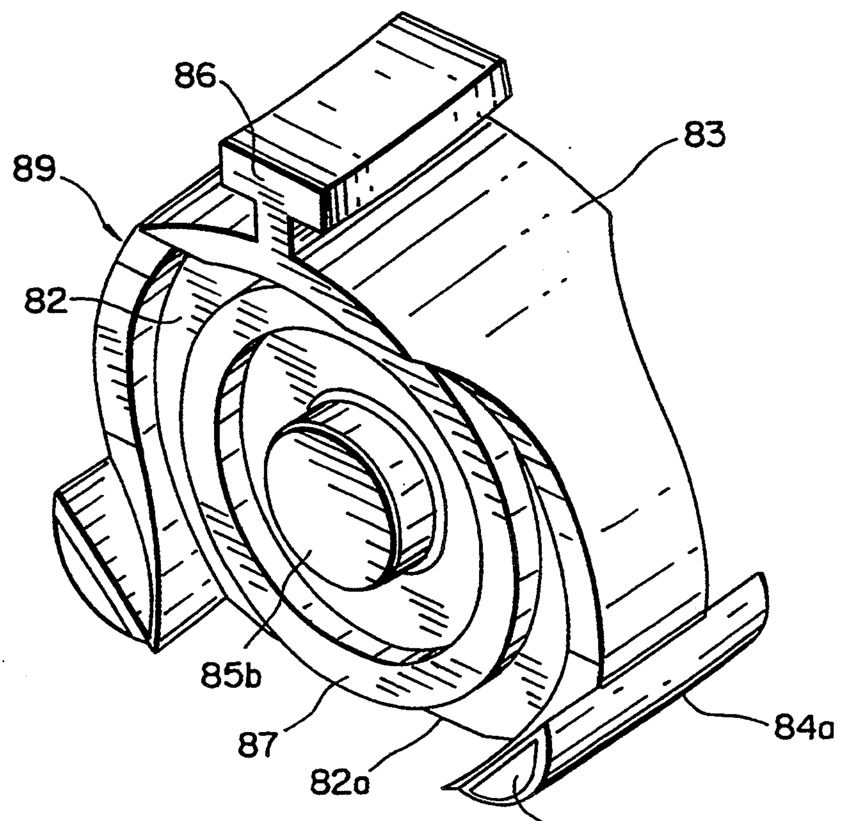
FIG. 18 is a perspective view of a joint protector.
Figure 19:
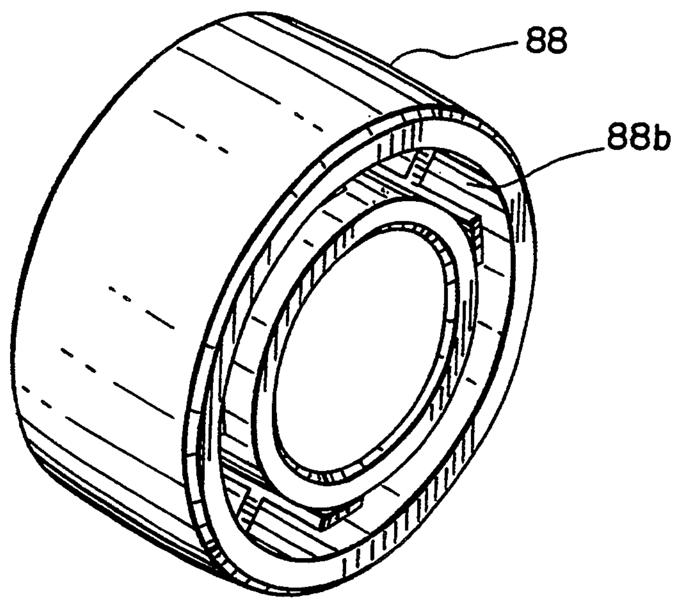
FIG. 19 is a perspective view of a modification of the sub-wheel.

FIG. 18 shows a joint protector used in combination with the sub-wheel supporting member 81. This joint protector 89 has substantially the same configuration as the sub-wheel supporting member 81 and is provided, in place of the sub-wheel supporting shaft 85, with joint shafts 85*b* which are shorter in length than the sub-wheel supporting shaft 85. Each of the joint shafts 85*b* is in the form of being fitted in the center hole of the sub-wheel supporting shaft 85. For parts other than those described above, the same reference numerals are affixed to the same parts as in FIG. 17 and description thereof is omitted.

Figure 21:
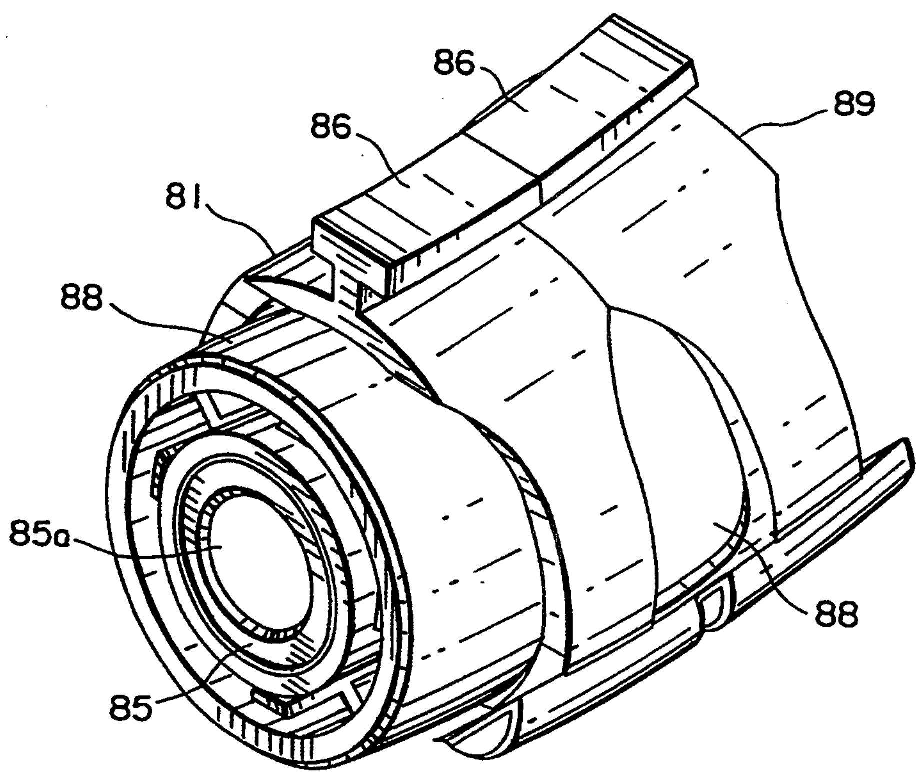
FIG. 21 is a perspective view of one assembled block.
Figure 20:
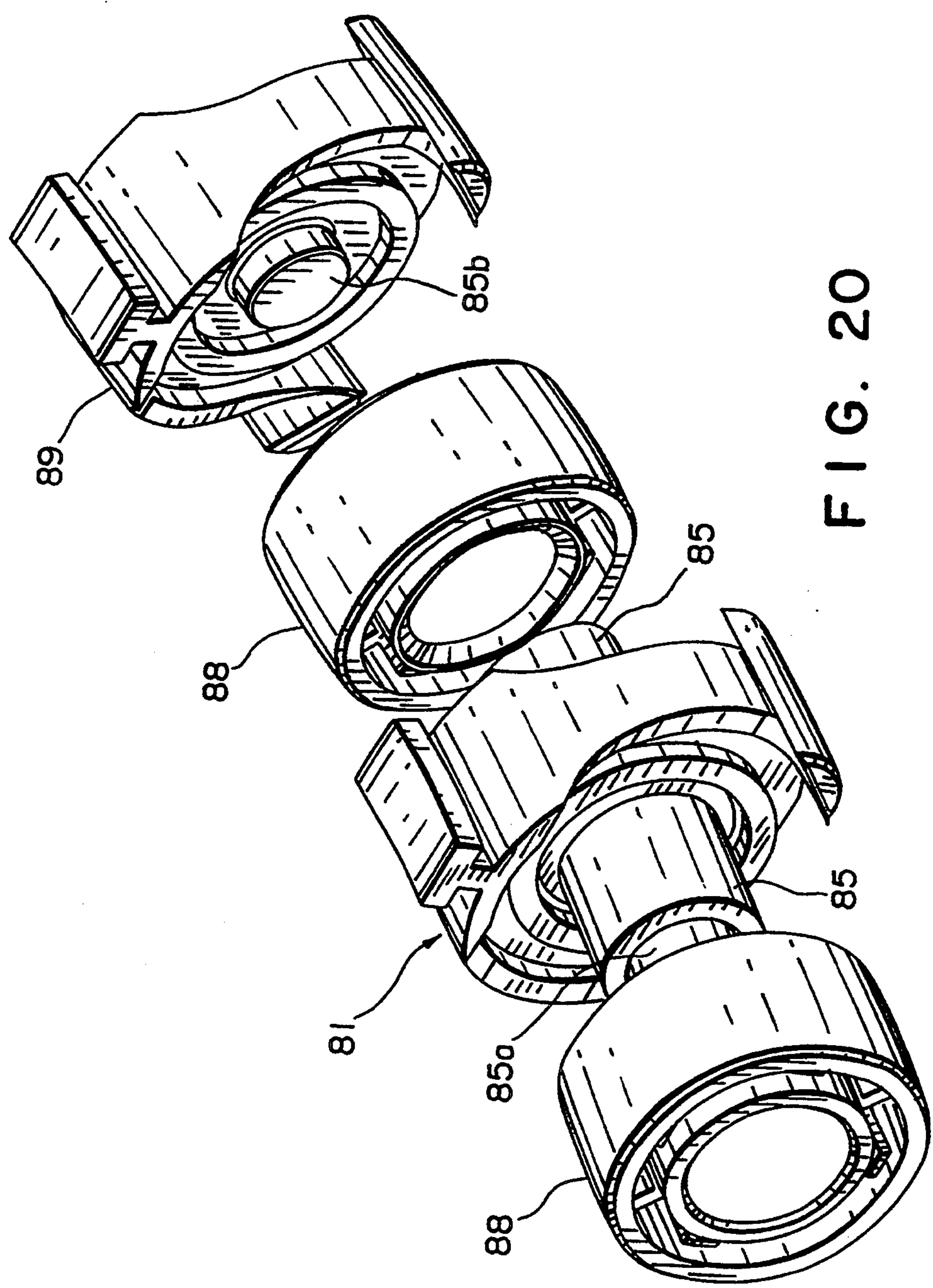
FIG. 20 is an exploded perspective view illustrating a method for assembly thereof.
Figure 22:
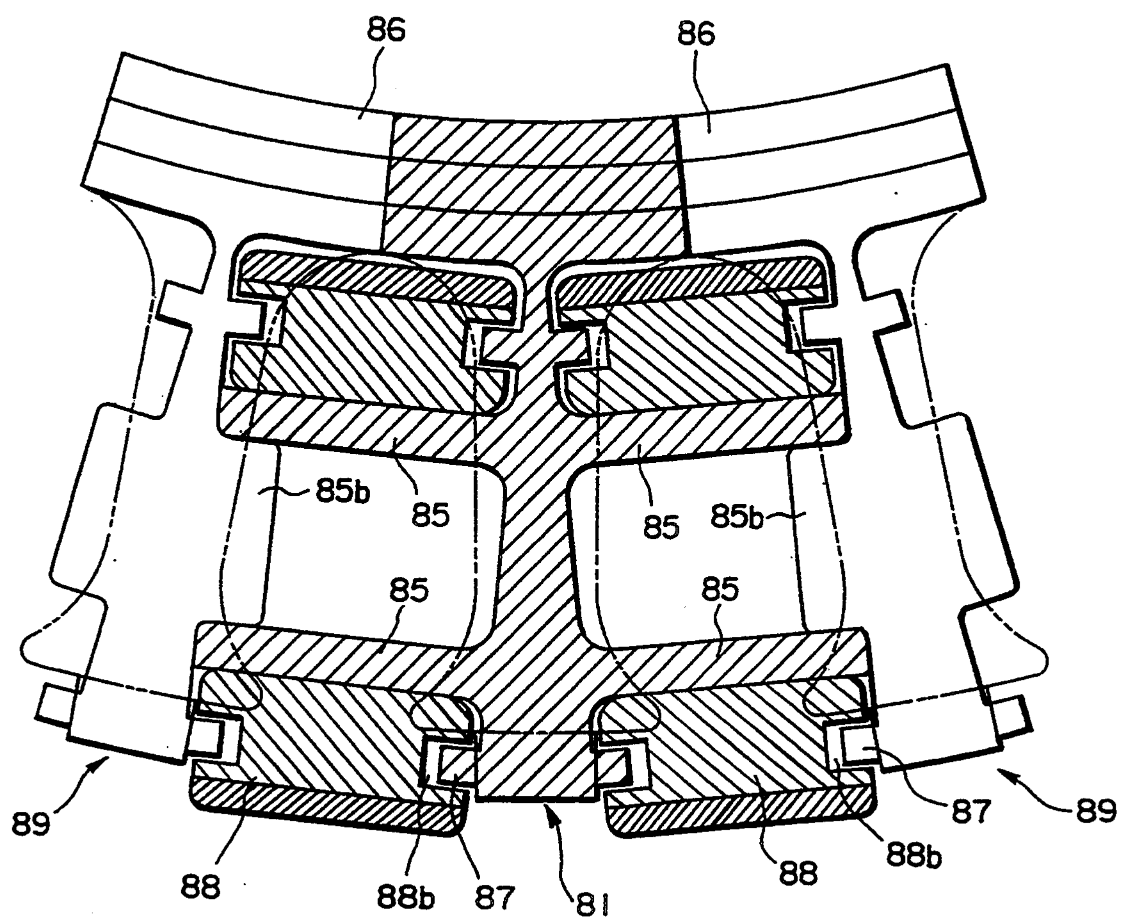
FIG. 22 is a partial sectional view illustrating the construction for supporting the sub-wheels.

Each hollow cylindrical sub-wheel 88 is formed with a recess 88*b* to function as labyrinth type seal, as shown in FIG. 18. The sub-wheels 88 are rotatably fitted on the sub-wheel supporting shafts 85, from both ends of the sub-wheel supporting member 81, as shown in FIGS. 20 to 22. Each of the projections 87 enters into the recess 88*b* of a sub-wheel 88 so that the labyrinth type seal is formed. The joint protectors 89 are fitted to the sub-wheel supporting shafts 85 with the sub-wheels 88 mounted thereon in such a manner that the joint shafts 85*b* are fitted in the center holes 85*a*. The sub-wheel supporting shafts 85 of the adjacent sub-wheel supporting members 81 are assembled so that they are continuously connected through the joint shafts 85*b* of the joint protectors 89.

Figure 16:
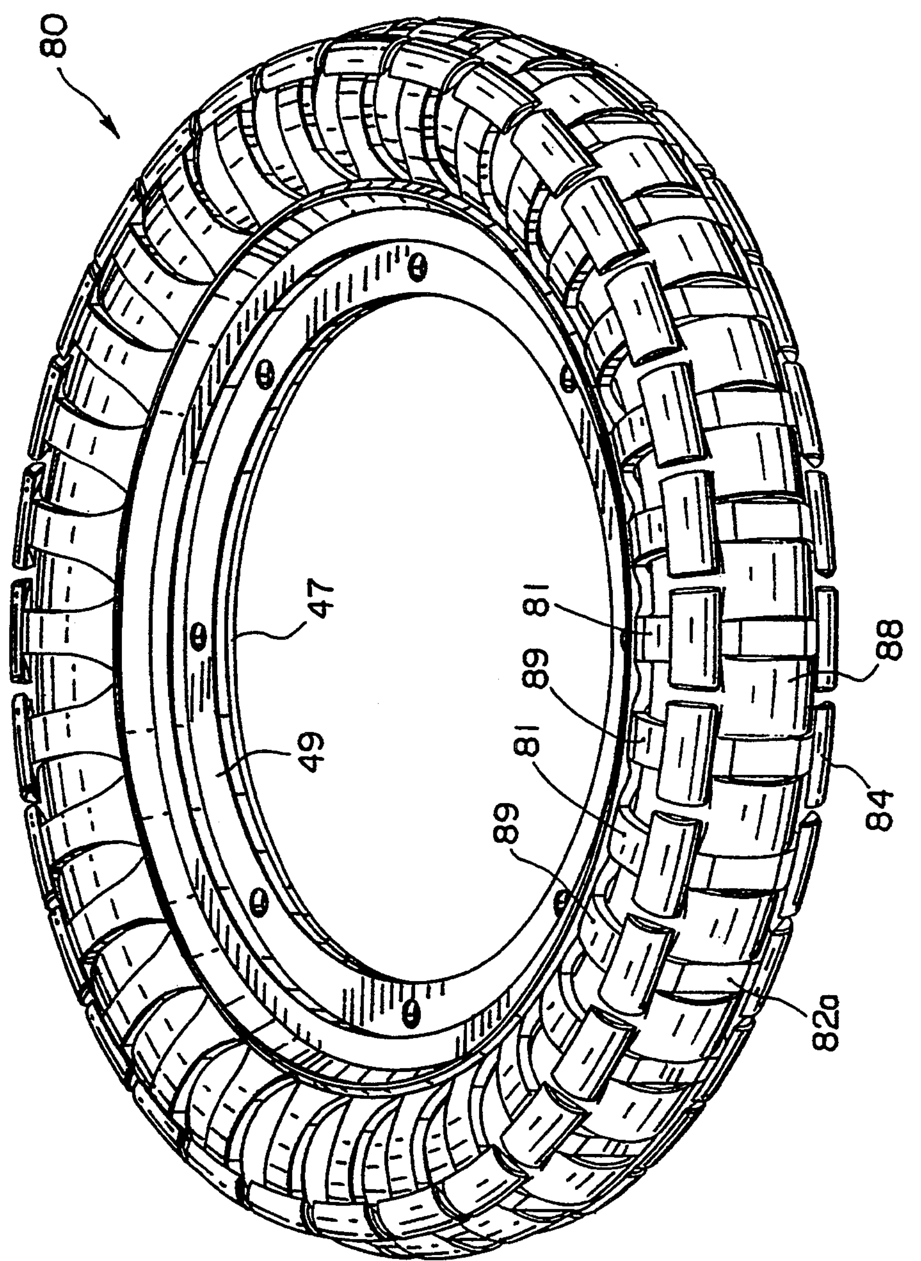
FIG. 16 is a perspective view illustrating a modification of the third embodiment.

The wheel 80 provided with the sub-wheels as shown in FIG. 16 is assembled from the sub-wheel supporting members 81 with the sub-wheels 88 rotatably mounted thereon and the joint protectors 89 fitted thereto, in such a manner that the guide rail members 86 are inserted into a plurality of grooves 48 formed on the outer circumference of the circular rim member 47 and subsequently the rim cover 49 is attached to the rim member 47, similarly as in the above described second embodiment.

When the wheel 80 according to the present embodiment is inclined more than a predetermined angle, the edge rubbers come into contact with the floor and perform a function of braking the rotation of the sub-wheels 88, similarly as in the third embodiment. In addition, the combination of the projections 87 with the sub-wheels 88 forms the labyrinth type seals which prevent any foreign matter from the outside from entering into the clearances between the sub-wheel supporting shaft 85 and the sub-wheels 88.

Moreover, the alternate combination of the joint protectors 89 with the sub-wheel supporting members 81 makes it possible to make greater the width of the sub-wheel 88 which can be supported by the sub-wheel supporting member 81, as compared with the third embodiment.

Figure 23:
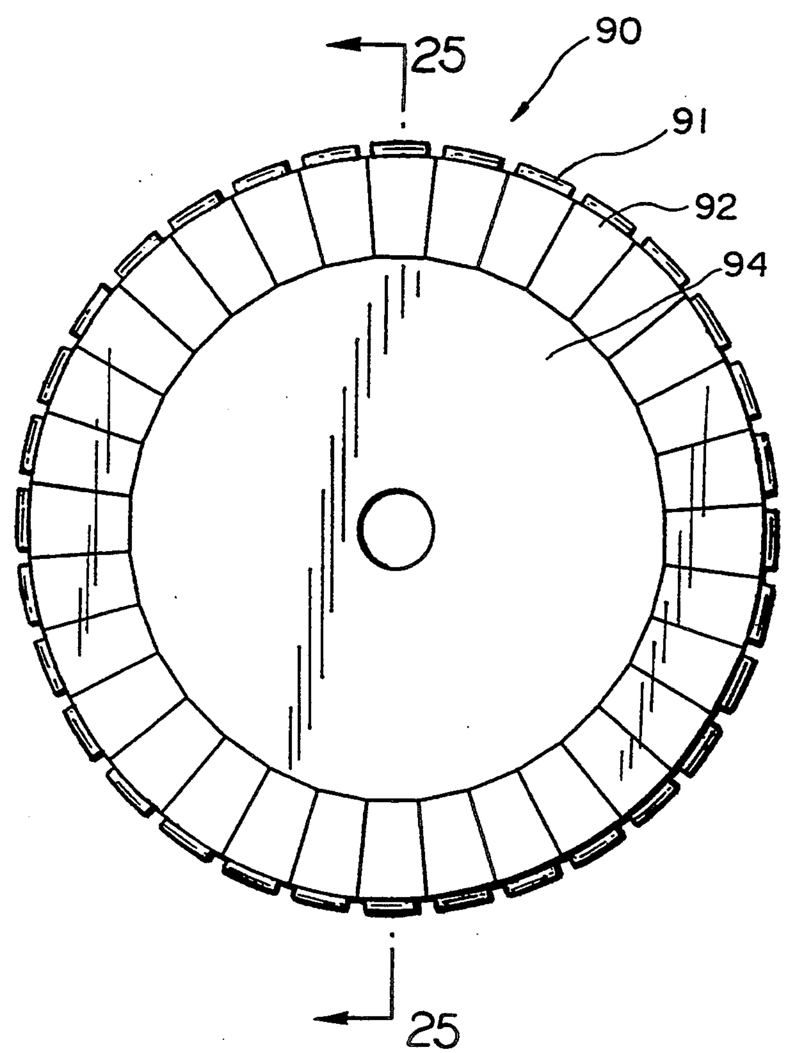
FIG. 23 is an axial view illustrating a fourth embodiment of the invention.
Figure 24:
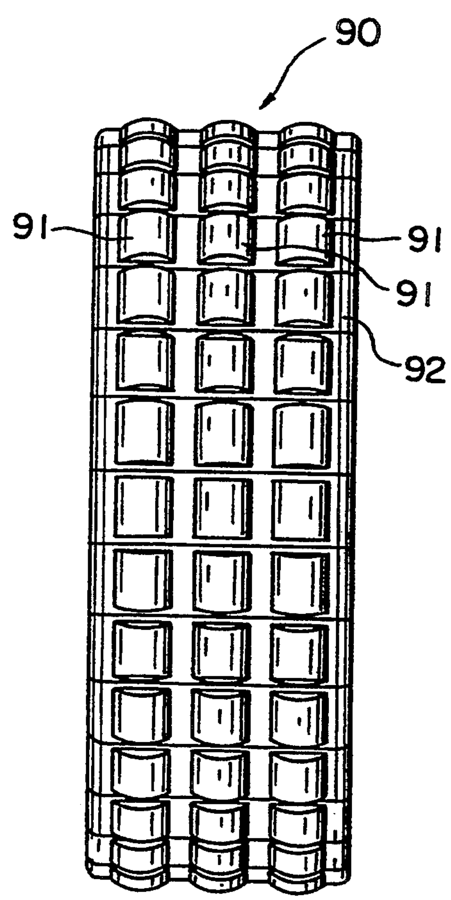
FIG. 24 is an orthogonal view of the wheel in FIG. 23.

FIGS. 23 to 25 show a fourth embodiment of the invention. In a wheel 90 according to this embodiment, plurality of sets of sub-wheels are mounted around the outer periphery of the wheel 90. Each set comprises a plurality of sub-wheels 91 (three sub-wheels in this embodiment) mounted in tandem with parallel axes. That is, the wheel 90 is constituted so that the three sub-wheels 91 are rotatably mounted each with a supporting shaft 93 as a center within each of a plurality of sub-wheel supporting blocks 92, the sub-wheels projecting particularly therefrom, and the sub-wheel supporting blocks 92 are arranged on the outer periphery of the disk rim member 94 at equal pitch intervals.

The present embodiment in which the plurality of sub-wheels 91 are arranged in tandem enables the width of the wheel 90 to be made greater so that the load applied to the wheel 90 may be increased.

Figure 26:
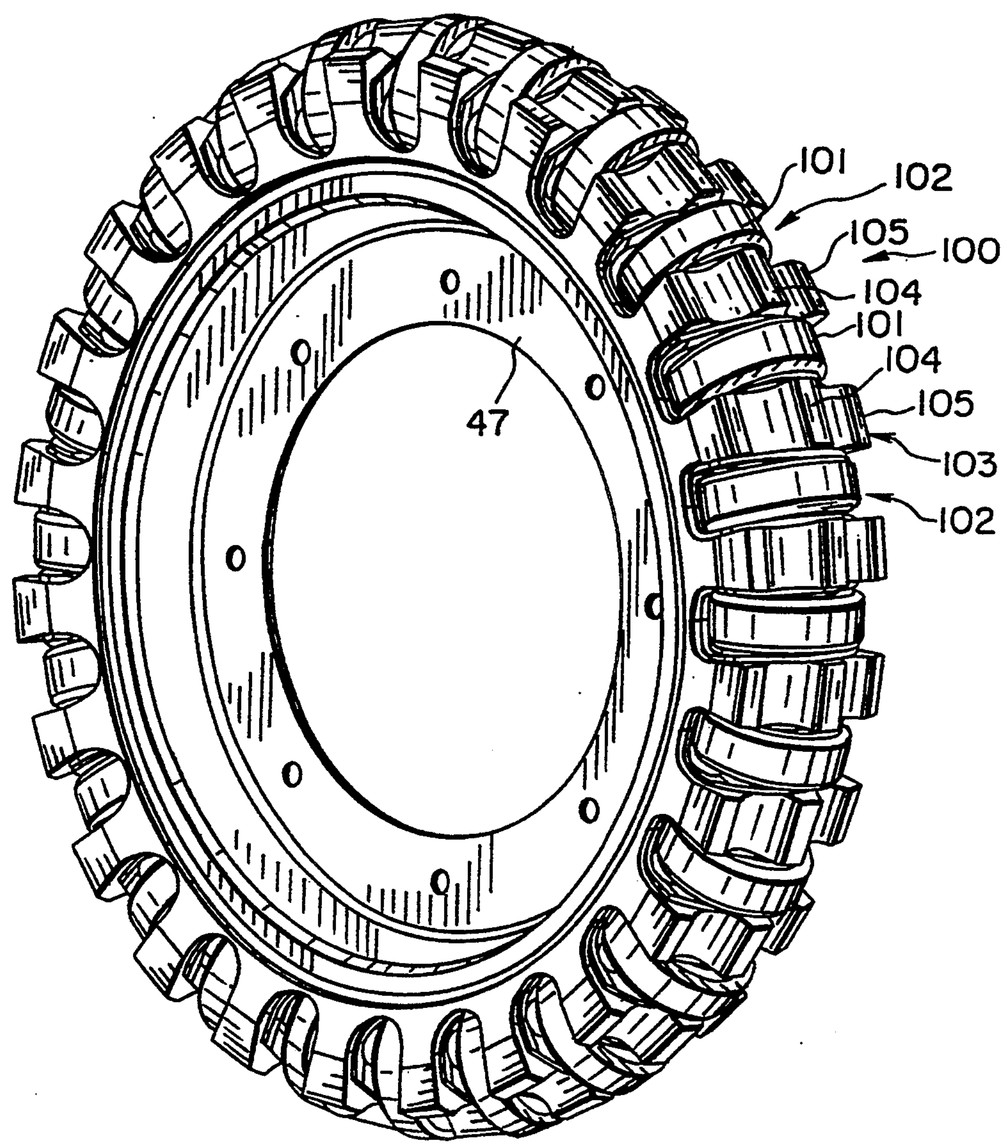
FIG. 26 is a perspective view illustrating a fifth embodiment of the invention.
Figure 27:
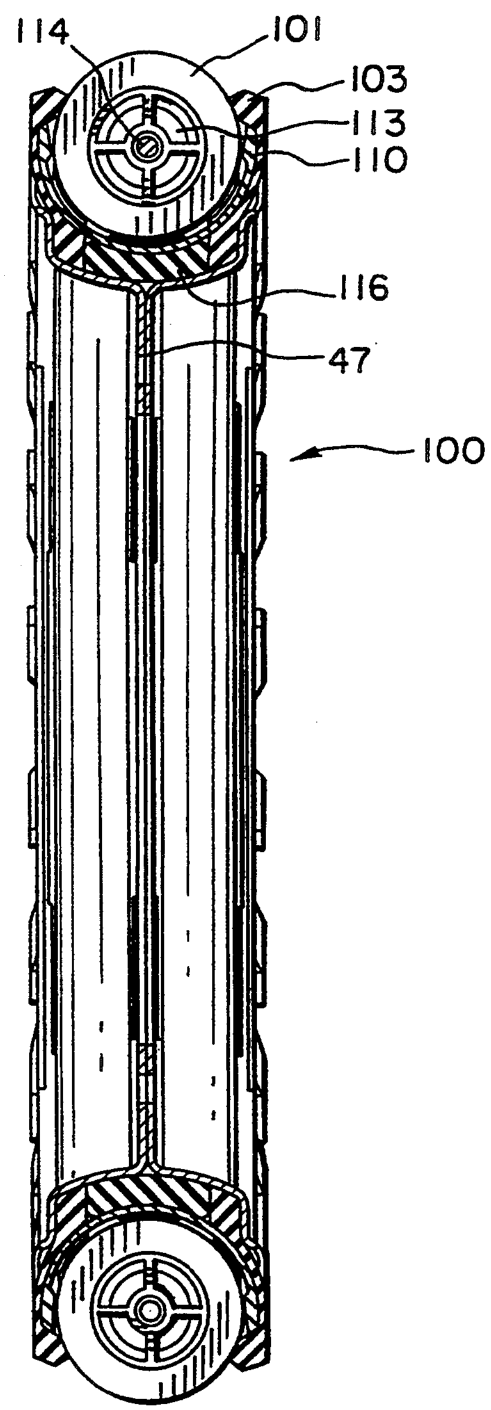
FIG. 27 is a sectional view of the wheel provided with sub-wheels according to the fifth embodiment.
Figure 28:
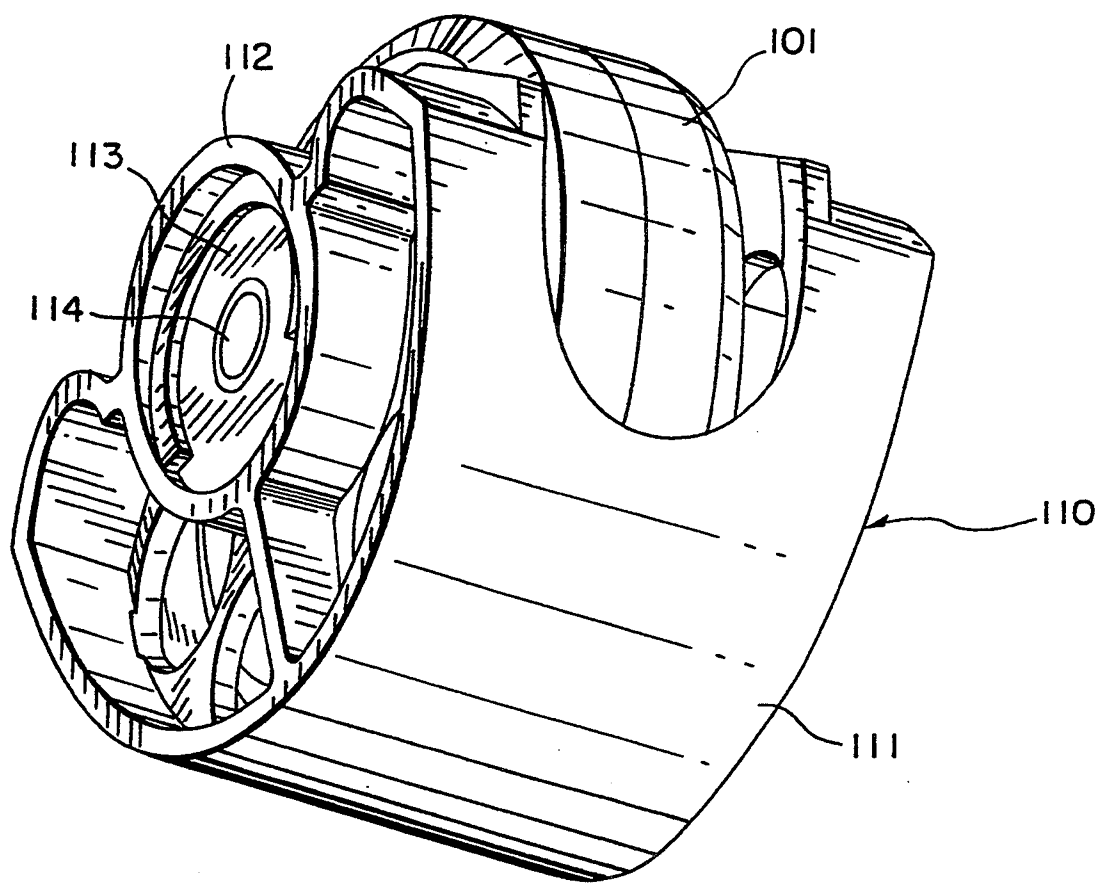
FIG. 28 is a perspective view illustrating the sub-wheel bearing in the fifth embodiment.

FIGS. 26 to 28 are views illustrating a fifth embodiment of the invention. In a wheel 100 provided with sub-wheels according to the invention, elastic interpositions are arranged between respective sub-wheels. These elastic interpositions form an outermost peripheral circle having substantially the same diameter as that of the outermost peripheral circle formed by all of the sub-wheels mounted on the wheel.

In this embodiment, a cover member 103 made of an elastic material such as rubber is fitted to the outer peripheral circle of the circular rim member 47. The cover member 103 is formed at the outer periphery thereof with a plurality of opened holes 102 having a width which allows mounting of the sub-wheels 101, these opened holes 102 being arranged in the circumferential direction at equal distances. Interpositions 105 provided with a plurality of radial projections 104 (in FIG. 26, three projections at the center and the left and right sides) are provided between adjacent opened holes 102 and 102.

These projections 105 are so constituted that the diameter of the circumference formed by connecting the center projections 104 of the interpositions 105 arranged in the circumferential direction is substantially the same as that of the circumference of the tire part formed by all of the sub-wheels 101 arranged in the circumference.

As shown in FIG. 28, each sub-wheel 101 is rotatably supported on a sub-wheel bearing 110 having a half cylindrical surface 111 to be mounted on the rim member, a portion of the sub-wheel 101 projecting towards the side opposite the surface 111. That is, the sub-wheel bearing 110 is provided with hollow cylindrical portions 112 concentric with the surface 111 to be mounted on the rim member. The rotary shaft 114 of the sub-wheel 101 is supported at both ends thereof within the hollow cylindrical portions 112 by bearing members such as ball or roller bearings.

As shown in FIG. 27, the sub-wheel bearing 110 is mounted so that an elastic member 116 is interposed between the outer peripheral surface of the circular rim member 47 at the center thereof and the surface 111 to be mounted on the rim member, and the hollow cylindrical portions 112 are covered by the interpositions 105 of the cover member 103. Preferably, the mounting of the sub-wheel bearing 111 is carried out after the mounting of the sub-wheel 101 therein as shown in FIG. 28.

In the wheel 100 according to the present embodiment, since the surfaces of the sub-wheels 101 which come in contact with the ground and the surfaces of the center projections 104 of the interpositions 105 which come in contact with the ground are arranged substantially on the same circumference, the sub-wheels 101 and the interpositions 105 come in contact with the ground alternately when the wheel 100 runs straight ahead.

This brings about smooth rotational movement of the wheel 100, thereby permitting vibration caused during the running thereof to be reduced. In addition, since the load applied to the wheel 100 can be received by both the sub-wheels 101 and the interpositions 105, the load applied to the wheel 100 can be increased.

Moreover, in the wheel 100 according to the present embodiment, when the inclination thereof occurs during the running thereof, the projections 104 of the interpositions 105 is elastically deformed in proportion to the inclination so that the straight running of the wheel 105 and the running thereof in the direction perpendicular thereto are not hindered.

Besides, also when the wheel 100 is inclined by more than a specific angle, the projections 104 of the interpositions 105 are elastically deformed so as not to cause excessive friction between the floor and the projections.

Industrial Applicability

As described above, the present invention permits the running direction of the wheel to be changed arbitrarily and simply without describing a locus of a circular arc. Further, since it is not constituted as a combination of wheels required to provide a steering handle for a wheel shaft and perform an operation of shifting depending on the running direction, the construction for mounting the wheel is simple and complicated and larger-sized construction of the wheel is not required.

The wheel provided with sub-wheels according to the invention can be used as a single constitution similar to the conventional wheel, and if it is used for wheels for vehicles required to change the running direction in a narrower space, an operating robot required to change the running direction without describing a locus of a circular arc, or a running wheel for sporting goods which requires special control, it provides particularly superior effects.

We claim:

1. A wheel provided with sub-wheels, which comprises:

wheel means for forming a wheel having a circular rim formed around the outer periphery thereof;

a plurality of sub-wheel supporting means mounted on and around said circular rim so as to be directed radially and outwardly; and a plurality of sub-wheels each rotatably supported by a respective one of said sub-wheel supporting means for rotation about an axis extending tangentially to said circular rim, said plurality of sub-wheels being arranged on the outer periphery of said wheel for constituting a tire;

wherein each sub-wheel supporting means comprises two inclined surfaces each inclined by a specific angle towards each other, and a main shaft and a sub-shaft on said inclined surfaces so as to project therefrom, said main shaft having at the center portion thereof a hole in which one of said sub-wheels of the sub-wheel supporting means adjacent thereto is fitted and having on the outer periphery thereof another of said sub-wheels mounted rotatably;

wherein a joint protector is interposed between each adjacent pair of said sub-wheel supporting means, said joint protector having a wedge-shaped section and being provided with two short shafts fitted in the center holes of said sub-wheel supporting shafts; and wherein an elastic interposition member is disposed around the circumference of the wheel and has radially outward projections interposed between each adjacent pair of said sub-wheels, said interposition member having an outermost diameter which is substantially the same as the outermost peripheral diameter of the tire constituted by the sub-wheels.

2. A wheel provided with sub-wheels as claimed in claim 1, wherein each sub-wheel supporting means is provided in the inclined surface thereof with a ring-like projection concentric with a rotational axis of the sub-wheel, and the sub-wheel rotatably supported by the sub-wheel supporting means is provided in the side surface thereof with a circular concave groove in which said ring-like projection can enter.

3. A wheel provided with sub-wheels, which comprises:

wheel supporting means having a circular rim formed around the outer periphery thereof a plurality of sub-wheels, each sub-wheel having an axial shaft extending from opposite sides thereof; and a plurality of sub-wheel supporting means mounted on and around said circular rim so as to be directed radially and outwardly, said sub-wheel supporting means being provided with bearing holes for rotatably supporting said shafts of respective ones of said sub-wheels at said opposite sides thereof for respective rotation about said axes tangentially to said circular rim with said plurality of sub-wheels arranged at said outer periphery of said wheel, whereby to constitute a tire.

4. A wheel provided with sub-wheels as claimed in claim 3, wherein each sub-wheel supporting means is a sub-wheel supporting block rotatably supporting a plurality of sub-wheels in tandem with axes parallel to the plane of the wheel.

5. A wheel provided with sub-wheels as claimed in claim 3, said wheel supporting means are provided with a plurality of grooves on the circular rim at equal pitch intervals and said sub-wheel supporting means are fitted in a respective one of the grooves.

6. A wheel provided with sub-wheels as claimed in claim 3, each sub-wheel supporting means is provided with edge means at both ends thereof.

* * * * *